United States Patent
Shin et al.

(10) Patent No.: US 12,330,592 B2
(45) Date of Patent: Jun. 17, 2025

(54) GLOVE BOX OPENING AND CLOSING APPARATUS AND GLOVE BOX ASSEMBLY COMPRISING THE SAME

(71) Applicant: HYUNDAI MOBIS CO., LTD., Seoul (KR)

(72) Inventors: Ju Han Shin, Yongin-si (KR); Dong Nyung Jin, Incheon (KR)

(73) Assignee: Hyundai Mobis Co., Ltd., Seoul (KR)

( * ) Notice: Subject to any disclaimer, the term of this patent is extended or adjusted under 35 U.S.C. 154(b) by 388 days.

(21) Appl. No.: 18/073,692

(22) Filed: Dec. 2, 2022

(65) Prior Publication Data

US 2024/0067097 A1    Feb. 29, 2024

(30) Foreign Application Priority Data

Aug. 26, 2022  (KR) .................. 10-2022-0107266

(51) Int. Cl.
  *B60R 7/06*    (2006.01)
(52) U.S. Cl.
  CPC ..................... *B60R 7/06* (2013.01)
(58) Field of Classification Search
  CPC ..... B60R 7/04; B60R 7/06; B60R 2011/0005; E05C 9/04; E05C 9/041; E05C 9/042; E05C 9/048; E05C 9/14; E05C 9/16; E05C 9/19; E05B 83/28; E05B 83/30; E05B 83/32
  USPC ....................... 296/24.34, 37.12, 37.15, 37.8
  See application file for complete search history.

(56) References Cited

U.S. PATENT DOCUMENTS

| | | | |
|---|---|---|---|
| 11,454,054 B2* | 9/2022 | Kondo | E05C 9/043 |
| 12,049,773 B2* | 7/2024 | Carabalona | E05B 13/10 |
| 2004/0168487 A1* | 9/2004 | Sawatani | B60R 7/06 |
| | | | 70/145 |
| 2005/0183523 A1* | 8/2005 | Kojima | G05G 1/10 |
| | | | 74/10.27 |
| 2006/0005589 A1* | 1/2006 | Hanjono | E05B 83/30 |
| | | | 70/208 |
| 2007/0216173 A1* | 9/2007 | Vitry | E05B 77/36 |
| | | | 292/336.3 |

(Continued)

FOREIGN PATENT DOCUMENTS

| | | |
|---|---|---|
| CN | 208073185 U | 11/2018 |
| KR | 10-2003-0070949 A | 9/2003 |
| KR | 10-2022-0067898 A | 5/2022 |

OTHER PUBLICATIONS

Korean Office Action issued on Feb. 29, 2024, in counterpart Korean Patent Application No. 10-2022-0107266 (6 pages in Korean).

(Continued)

*Primary Examiner* — Joseph D. Pape
(74) *Attorney, Agent, or Firm* — NSIP Law (57) ABSTRACT

Disclosed is a glove box opening and closing apparatus. The apparatus includes a knob rotatably coupled to a glove box and configured to be disposed at one of a first position and a second position, a rotator that rotates in conjunction with rotation of the knob, and rods that move in conjunction with the rotation of the rotator. The rotator includes a link in contact with the knob, an interlocking surface is formed on the link, and the knob is configured to come into contact with a different area of the interlocking surface when the knob moves from the first position to the second position.

14 Claims, 9 Drawing Sheets

(56) References Cited

U.S. PATENT DOCUMENTS

| | | | |
|---|---|---|---|
| 2009/0206625 A1* | 8/2009 | Toppani | E05B 63/143 |
| | | | 296/37.12 |
| 2014/0152026 A1* | 6/2014 | Cinco | E05B 83/28 |
| | | | 292/139 |
| 2019/0153766 A1* | 5/2019 | Knappe | E05B 81/20 |
| 2020/0378163 A1* | 12/2020 | Singh | E05B 13/101 |
| 2020/0392772 A1* | 12/2020 | Carabalona | E05B 63/0056 |
| 2022/0154502 A1 | 5/2022 | Son et al. | |
| 2022/0290472 A1* | 9/2022 | Woo | E05B 77/06 |
| 2024/0123908 A1* | 4/2024 | Suzuki | B60R 7/06 |

OTHER PUBLICATIONS

Extended European search report issued on Aug. 17, 2023, in counterpart European Patent Application No. 22215772.9 (7 pages).

* cited by examiner

GLOVE BOX OPENING AND CLOSING APPARATUS AND GLOVE BOX ASSEMBLY COMPRISING THE SAME

CROSS-REFERENCE TO RELATED APPLICATIONS

This application claims the benefit under 35 USC § 119(a) of Korean Patent Application No. 10-2022-0107266, filed on Aug. 26, 2022, in the Korean Intellectual Property Office, the entire disclosure of which is incorporated herein by reference for all purposes.

BACKGROUND

1. Field

The present invention relates to a glove box opening and closing apparatus and a glove box assembly including the same.

2. Description of Related Art

Generally, a glove box assembly for accommodating simple objects is provided in a vehicle. The glove box assembly is disposed in a dashboard in front of a passenger's seat.

A glove box assembly includes a glove box having a hollow shape for accommodating objects and an opening and closing apparatus attached to the glove box for opening or closing an inner space of the glove box. The opening and closing apparatus may include a push type opening and closing apparatus or a pull type opening and closing apparatus.

Among them, the opening and closing apparatus may include a push type or pull type knob pulled or pressed by a user, a plurality of rods moved by the movement of the knob, and a gear disposed between the plurality of rods to move the rods in different directions.

Conventional opening and closing apparatuses operate through a linear method in which a force transmitted by a knob is directly transmitted to a rod to move the rod. In the conventional opening and closing apparatuses, the loss of the force transmitted from a user is sought to be small, the number of components are sought to be minimized.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a glove box opening and closing apparatus. The apparatus includes a knob rotatably coupled to a glove box and configured to be disposed at one of a first position and a second position, a rotator that rotates in conjunction with rotation of the knob, and rods that move in conjunction with the rotation of the rotator. The rotator includes a link in contact with the knob, an interlocking surface is formed on the link, and a contact area of the interlocking surface change more the knob moves from the first position to the second position.

The interlocking surface may be disposed inside a rotation path of the knob.

The knob may include a first housing coupled to the glove box, a knob body disposed in the first housing, and a rotating shaft which connects the first housing and the knob body and is a rotation center of the knob body. The knob body may include a pressing protrusion which protrudes from a part of the first housing in a direction from the first housing toward the rotator and of which an end portion is in contact with the interlocking surface.

The knob may include a second housing connected to the rotating shaft and coupled to the rotator through a coupling member, the rotator may include a fixing block fixed to the second housing by the coupling member and a rotator body rotatably coupled to the fixing block, and the link is disposed at one side of the rotator body in a longitudinal direction of the rotating shaft.

The pressing protrusion may maintain a state of not pressing the interlocking surface when the link is disposed at the first position and maintain a state of pressing the interlocking surface when the link is disposed at the second position, and the pressing protrusion may be rotatable between the first position and the second position.

The rotator body may have a rotation distance corresponding to a rotation distance of the pressing protrusion which rotates from the first position toward the second position.

The rod may include a protruding frame in contact with the rotator body. The rotator body is configured to move with the protruding frame pressed by the rotator body in response to the pressing protrusion moving from the first position toward the second position.

The interlocking surface may include a first region in which the pressing protrusion is disposed at the first position, and a second region in which the pressing protrusion is disposed at the second position.

The first region may include a 1-1 region in contact with the pressing protrusion disposed at the first position and a 1-2 region not in contact with the pressing protrusion disposed at the first position.

The second region may include a 2-1 region not in contact with the pressing protrusion disposed at the second position and a 2-2 region in contact with the pressing protrusion disposed at the second position.

The interlocking surface may have a shape inclined in a direction from the 1-1 region toward the 2-2 region.

In another general aspect, here is provided a glove box assembly that includes a glove box coupled to a dashboard of a vehicle, and a glove box opening and closing apparatus which is attached to the glove box and configured to open or close an inner portion of the glove box. The glove box opening and closing apparatus includes a knob rotatably coupled to a glove box and configured to be disposed at one of a first position and a second position, a rotator configured to rotate in conjunction with rotation of the knob, and at least one rod configured to move in conjunction with the rotation of the rotator. The rotator includes a link in contact with the knob. An interlocking surface is formed on the link, and a contact area of the interlocking surface change more the knob moves from the first position to the second position.

The interlocking surface may be disposed inside a rotation path of the knob.

The knob may include a first housing coupled to the glove box, a knob body disposed in the first housing, and a rotating shaft which connects the first housing and the knob body and is a rotation center of the knob body, wherein the knob body may include a pressing protrusion which protrudes from a part of the first housing in a direction from the first housing toward the rotator and of which an end portion is in contact with the interlocking surface.

The knob may include a second housing connected to the rotating shaft and coupled to the rotator through a coupling member, the rotator may include a fixing block fixed to the second housing by the coupling member and a rotator body rotatably coupled to the fixing block, and the link may be disposed at one side of the rotator body in a longitudinal direction of the rotating shaft.

The pressing protrusion may maintain a state of not pressing the interlocking surface when the link is disposed at the first position and maintain a state of pressing the interlocking surface when the link is disposed at the second position, and the pressing protrusion may be rotatable between the first position and the second position.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, a glove box opening and closing apparatus and a glove box assembly including the same will be described in detail with reference to the accompanying drawings, components that are the same or correspond to each other will be denoted by the same or corresponding reference numerals regardless of symbols the accompanying drawings, and redundant descriptions may be omitted.

Figure 1:
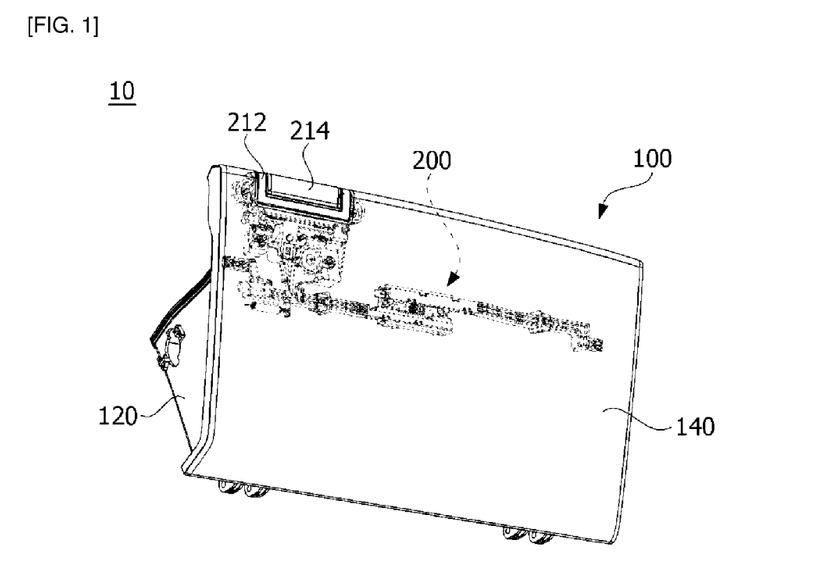
FIG. 1 is a perspective view illustrating a glove box assembly according to an embodiment of the present disclosure.
Figure 2:
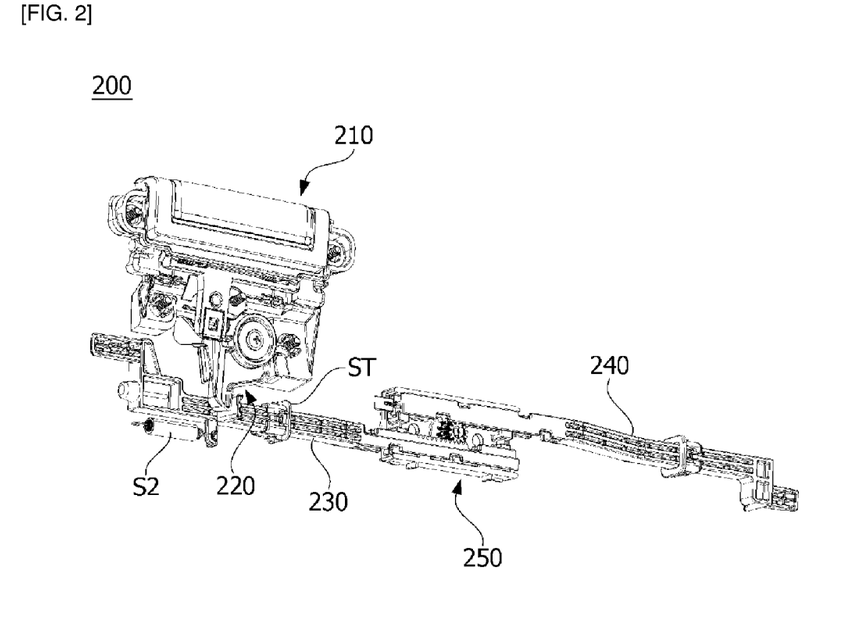
FIG. 2 is a perspective view illustrating a glove box opening and closing apparatus according to an embodiment of the present disclosure.
Figure 3:
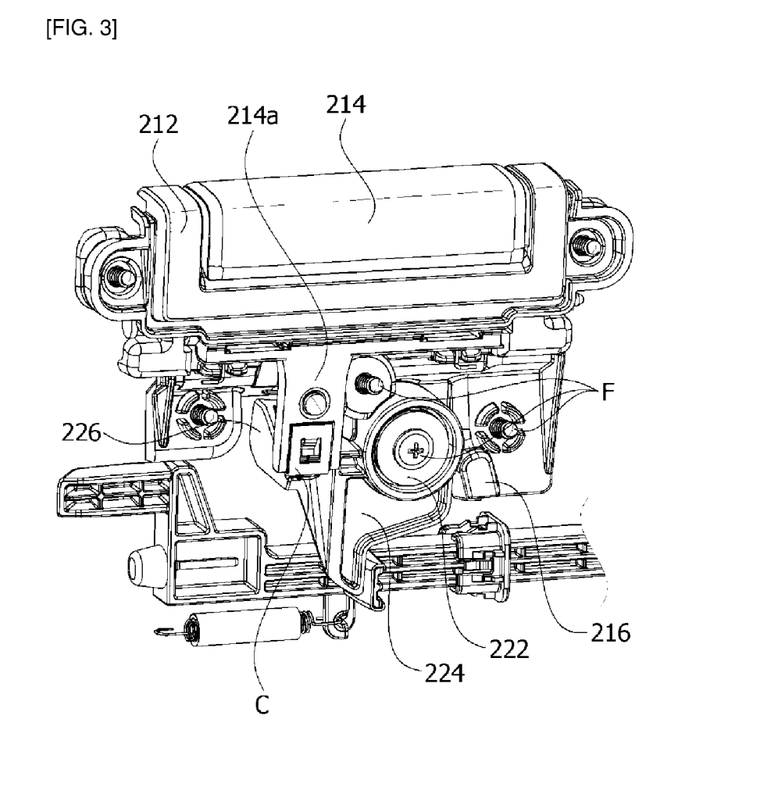
FIG. 3 is an enlarged view illustrating a part of the glove box opening and closing apparatus according to an embodiment of the present disclosure.
Figure 4:
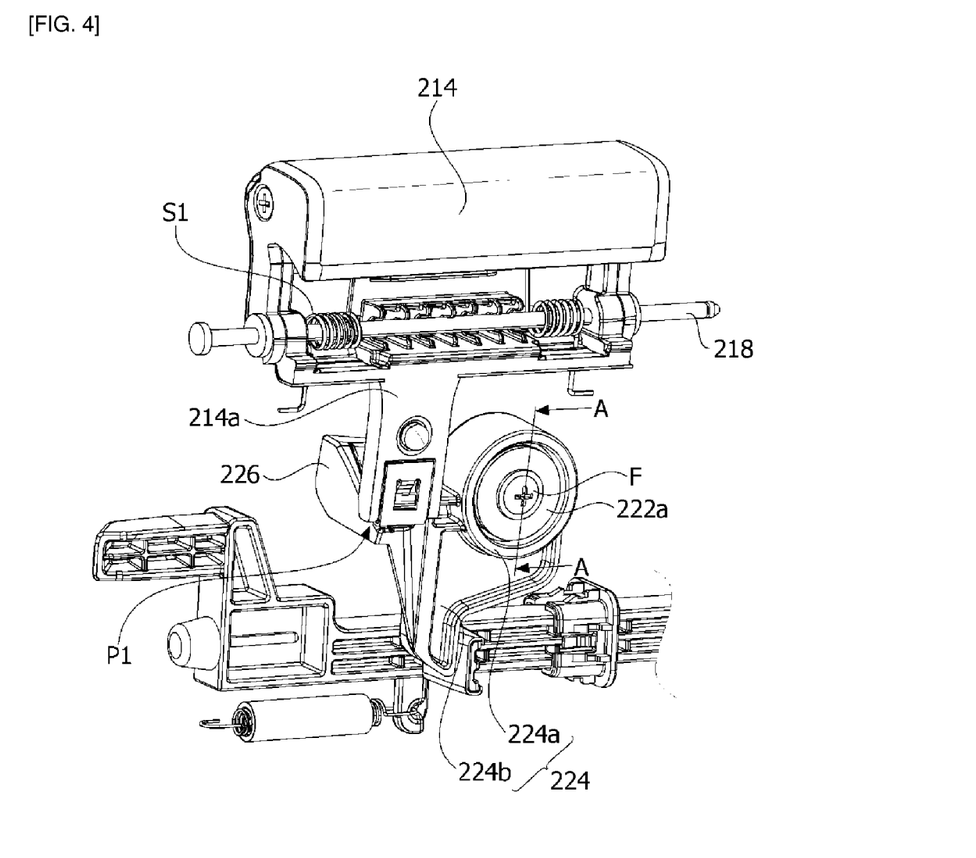
FIG. 4 is a view illustrating the glove box opening and closing apparatus of FIG. 3 from which a first housing and a second housing are removed according to an embodiment of the present disclosure.
Figure 5:
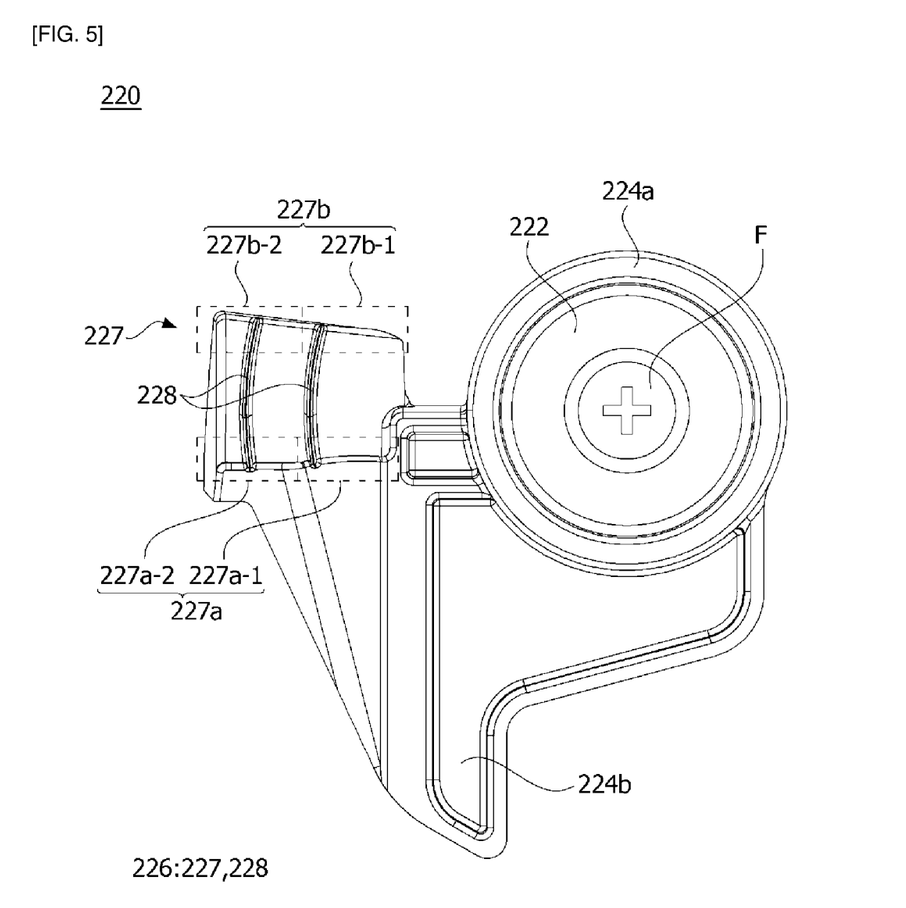
FIG. 5 is a front view illustrating a link according to an embodiment of the present disclosure.
Figure 6:
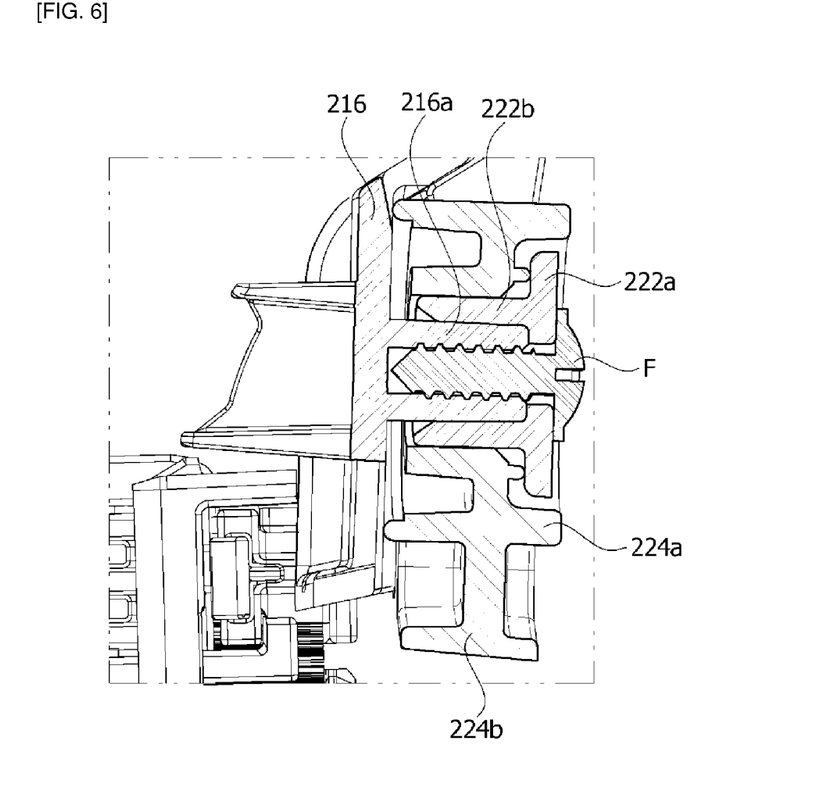
FIG. 6 is a cross-sectional view along line A-A of FIG. 4 according to an embodiment of the present disclosure.
Figure 7:
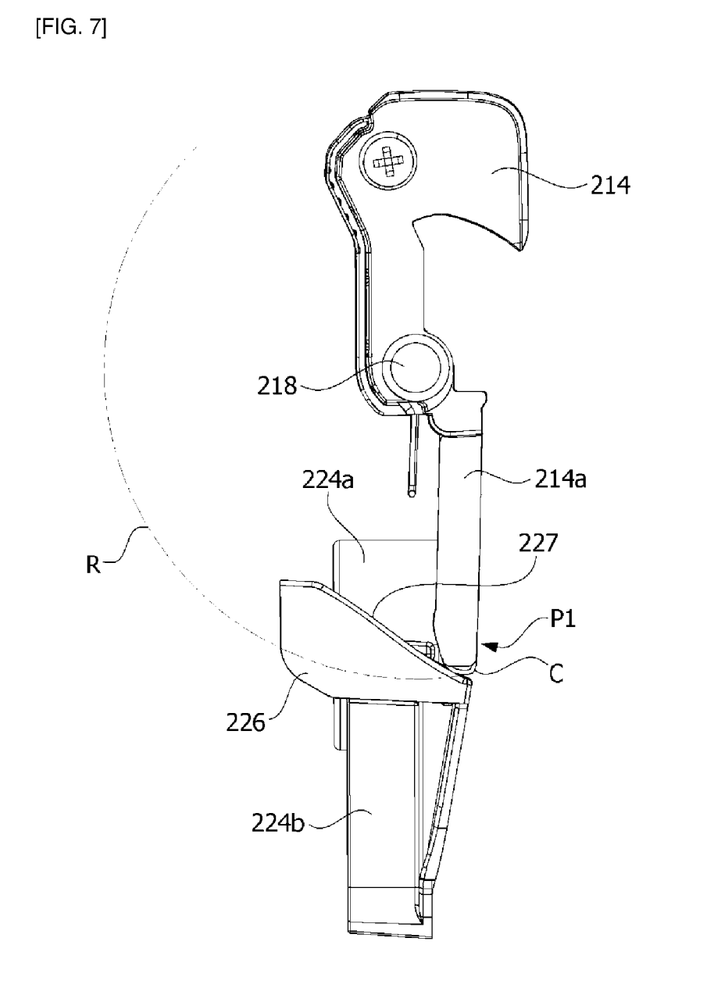
FIG. 7 is a side view illustrating a state of a pressing protrusion in contact with the link according to an embodiment of the present disclosure.
Figure 8:
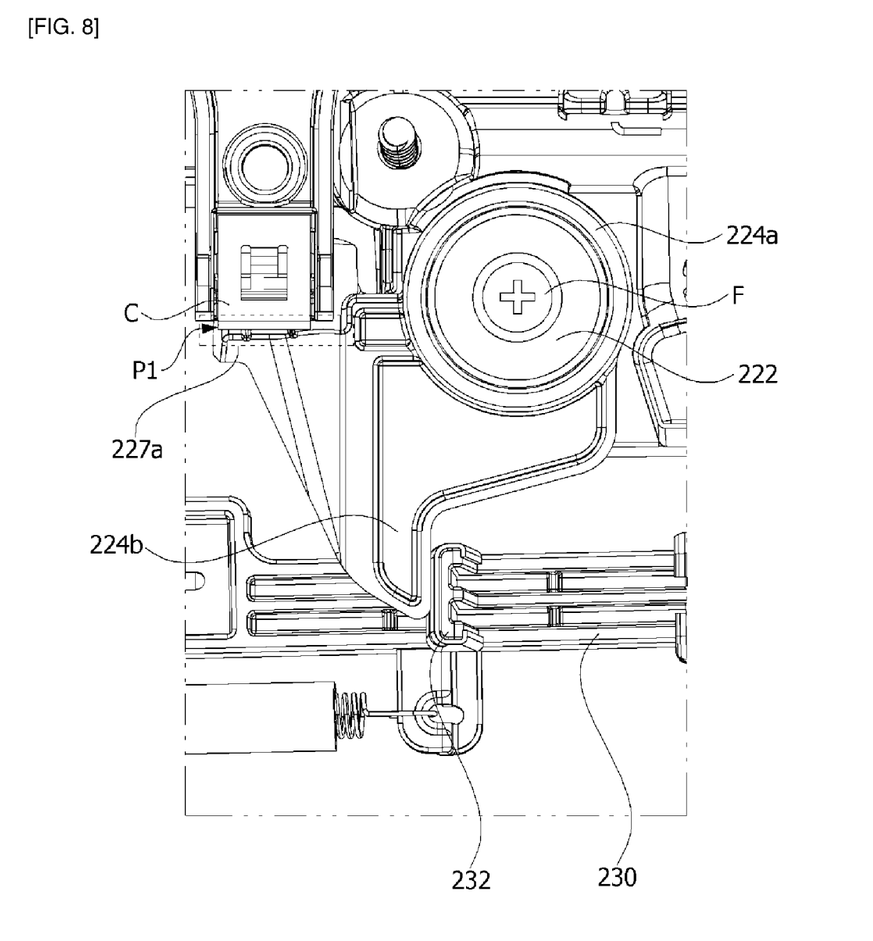
FIG. 8 is a plan view illustrating the state of the pressing protrusion in contact with the link according to another embodiment of the present disclosure.
Figure 9:
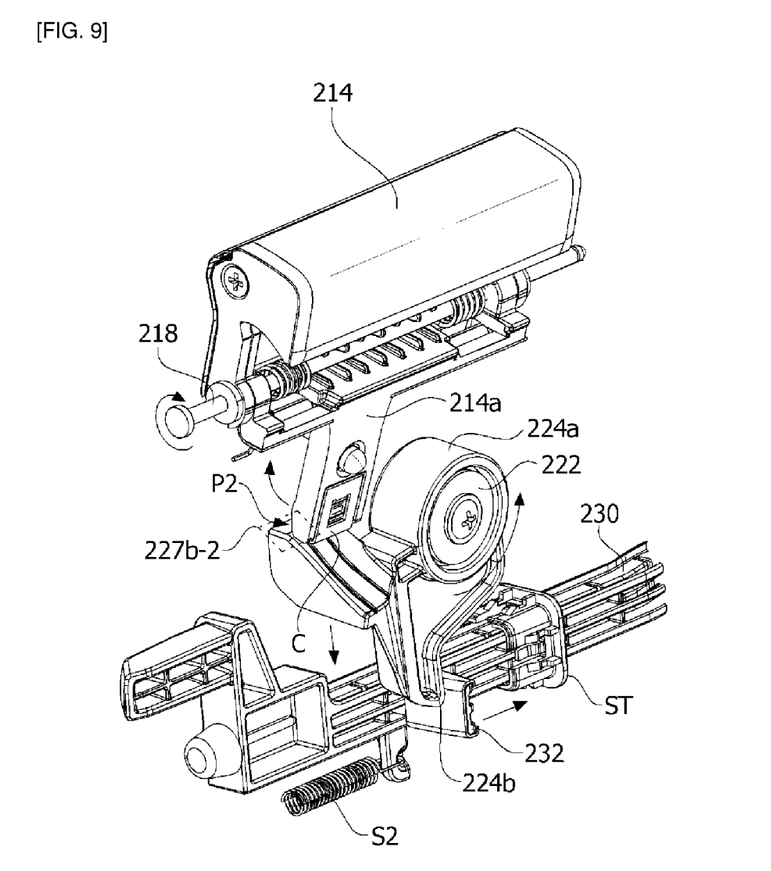
FIG. 9 is a view illustrating a state of the pressing protrusion disposed at a second position according to still another embodiment of the present disclosure.

FIG. 1 is a perspective view illustrating a glove box assembly according to one embodiment of the present invention, and FIG. 2 is a perspective view illustrating a glove box opening and closing apparatus. FIG. 3 is an enlarged view illustrating a part of the glove box opening and closing apparatus, and FIG. 4 is a view illustrating the glove box opening and closing apparatus of FIG. 3 from which a first housing and a second housing are removed. FIG. 5 is a front view illustrating a link, and FIG. 6 is a cross-sectional view along line A-A of FIG. 4. FIG. 7 is a side view illustrating a state of a pressing protrusion in contact with the link, FIG. 8 is a plan view illustrating the state of the pressing protrusion in contact with the link, and FIG. 9 is a view illustrating a state of the pressing protrusion disposed at a second position.

Referring to FIGS. 1 to 9, a glove box assembly 10 according to one embodiment of the present invention may include a knob 210 rotatably coupled to a glove box 100 and disposed at any one of a first position P1 or second position P2, a rotary unit 220 (for example, a rotator) which rotates in conjunction with the rotation of the knob 210, and at least one rod 230 which moves in conjunction with the rotation of the rotary unit 220, the rotary unit 220 includes a link 226 in contact with the knob 210, and an interlocking surface 227 is formed on the link 226 so that, as the knob 210 moves from the first position P1 to the second position P2, the knob 210 may come into contact with a different portion (or area) of the interlocking surface 227 (for example, the contact area of the interlocking surface 227 and the knob 210 may change).

The glove box 100 may be configured using a combination of a storage part 120 having a hollow shape and a front panel part 140 which covers one side of the storage part 120 and of which an outer surface is exposed to face a passenger's seat in a vehicle. A groove part is provided in the front panel part 140, and a part of an opening and closing apparatus 200 may be accommodated in the groove part. The groove part may be disposed at an upper side of the front panel part 140.

The opening and closing apparatus 200 may include the knob 210, the rotary unit 220, a first rod 230, a second rod 240, and a gear unit 250.

The knob 210 may be rotatably disposed on the glove box 100. More specifically, the knob 210 may be disposed in the groove part of the front panel part 140 of the glove box 100. The knob 210 may be disposed in the glove box 100 while disposed in the groove part.

The knob 210 may include a first housing 212, a knob body 214, a second housing 216, and a rotating shaft 218.

The first housing 212 may be coupled to the glove box 100. More specifically, the first housing 212 may be disposed in the groove part of the glove box 100. The first housing 212 may be formed in a hollow shape for accommodating the knob body 214.

The knob body 214 may be disposed in the first housing 212. An outer surface of the knob body 214 may be exposed to face a passenger's room in a state in which the knob body 214 is disposed in the first housing 212. The knob body 214 may be connected to the rotating shaft 218. The knob body 214 may be pulled by a user. When the knob body 214 is pulled by the user, the knob body 214 may rotate about the rotating shaft 218. Accommodation holes for accommodating the rotating shaft 218 may be formed in the knob body 214 and one side and the other side of the first housing 212.

The knob body 214 may include a pressing protrusion 214*a*.

The pressing protrusion 214*a* may protrude from one portion of the first housing 212 in a direction from the first housing 212 toward the rotary unit 220. The pressing protrusion 214*a* may be formed in a rectangular shape. An end portion of the pressing protrusion 214*a* may come into contact with the interlocking surface 227.

In a state in which the pressing protrusion 214*a* is in contact with the interlocking surface 227, the pressing protrusion 214*a* may be disposed at the first position P1 in a state while not rotating with the knob body 214 and pressing the interlocking surface 227 and at the second position P2 at which the pressing protrusion 214*a* rotates with the knob body 214 and presses the interlocking surface 227. The pressing protrusion 214*a* may rotate about the rotating shaft 218 between the first position P1 and the second position P2. As the pressing protrusion 214*a* rotates to move from the first position P1 to the second position P2, the link 226 of the rotary unit 220 may move in conjunction of the pressing protrusion 214*a*.

A clip C may be disposed on the pressing protrusion 214*a*. The clip C may be disposed on an end portion of the pressing protrusion 214*a*. The clip C may be formed of a material different from a material of the link 226. For example, the clip C may be formed of a steel material. The clip C is a component in direct contact with the interlocking surface 227 while coupled to the pressing protrusion 214*a*. Accordingly, the clip C can prevent a phenomenon in which an excessive frictional force is generated on the interlocking surface 227 to prevent damage to the interlocking surface 227 so as to maintain a lifetime of the interlocking surface 227.

As illustrated in FIG. 4, a first return spring S1 may be disposed in the knob body 214. When the user pulls and releases the knob body 214, the knob body 214 may return to a position before the user pulls the knob body 214 by the first return spring S1.

The second housing 216 may be connected to the rotating shaft 218 and coupled to the rotary unit 220 through coupling members F such as a bolt or screw. In this case, a protruding portion 216*a* for accommodating the coupling members F may be formed on the second housing 216. The protruding portion 216*a* may be formed in a hollow cylindrical shape. In addition, the second housing 216 may be fixedly coupled to the front panel part 140 of the glove box 100 through the coupling members F.

The rotating shaft 218 may connect the first housing 212 and the knob body 214 and may be a rotation center of the knob body 214. The rotating shaft 218 may be disposed in a longitudinal direction of the knob body 214. The rotating shaft 218 may be accommodated in the accommodation holes provided at the first housing 212 and one side and the other side of knob body 214 and may be supported by the first housing 212 and the knob body 214.

The rotary unit 220 may include a fixing block 222, a rotary unit body 224, and the link 226.

As illustrated in FIG. 5, the fixing block 222 may be configured using a combination of a plate part 222*a* having a circular shape and a block part 222*b* having a hollow cylindrical shape. A size of an inner circumference surface of the block part 222*b* of the fixing block 222 may correspond to a size of an outer circumference surface of the protruding portion 216*a* of the second housing 216. The fixing block 222 in a state in which the fixing block 222 is fixed to the protruding portion 216*a* may be fixed to the second housing 216 through the coupling members F.

The rotary unit body 224 may be rotatably coupled to the fixing block 222. More specifically, the rotary unit body 224 may include a rotating part 224a and a pushing part 224b.

The rotating part 224a may be rotatably coupled to the fixing block 222. As illustrated in FIG. 5, a shape of the rotating part 224a may be a hollow cylindrical shape. An inner portion of the rotating part 224a may have a shape for accommodating the plate part 222a and the block part 222b of the fixing block 222.

An inner circumference surface of the rotating part 224a for accommodating the block part 222b may have a shape corresponding to a shape of an outer circumference surface of the block part 222b of the fixing block 222. Accordingly, a rotation center of the fixing block may be the same as a rotation center of the rotary unit body 224 including the rotating part 224a. Accordingly, when the pressing protrusion 214a of the second housing 216 rotates about the rotating shaft 218 to press the link 226, the rotating part 224a of the rotary unit body 224 may rotate about the rotation center of the fixing block 222.

The pushing part 224b may be disposed at one side (for example, a lower side) of the rotating part 224a. The pushing part 224b may rotate with the rotating part 224a. The pushing part 224b may be in contact with the rod. When the pressing protrusion 214a presses the link 226 to rotate the rotating part 224a, the pushing part 224b may press the first rod 230 while rotating with the rotating part 224a. The first rod 230 pressed by the pushing part 224b may move forward or rearward in a longitudinal direction. Accordingly, the pushing part 224b may be regarded as a component for converting a rotational force into a linear force.

The link 226 may be disposed at one side of the rotating part 224a. More specifically, the link 226 may be disposed at one side of the rotating part 224a in a longitudinal direction of the rotating shaft 218 of the knob 210 from the rotating part 224a.

The link 226 may include the interlocking surface 227.

The interlocking surface 227 may be disposed inside a rotation path R of the knob 210. More specifically, when the pressing protrusion 214a, which rotates about the rotating shaft 218, rotates from the first position P1 to the second position P2, the interlocking surface 227 may be disposed at a position at which the interlocking surface 227 overlaps a part of the pressing protrusion 214a. Accordingly, when the pressing protrusion 214a rotates about the rotating shaft 218, the pressing protrusion 214a may press the interlocking surface 227, a pressing force of the pressing protrusion 214a may be constantly maintained due to the position of the interlocking surface 227.

A rotation distance of the interlocking surface 227 may correspond to a rotation distance of the pressing protrusion 214a which rotates from the first position P1 toward the second position P2.

More specifically, in a state in which the pressing protrusion 214a is in contact with the interlocking surface 227, when the pressing protrusion 214a moves (rotates) from the first position P1 to the second position P2, since the state in which the pressing protrusion 214a is in contact with the interlocking surface 227 is maintained without being released, a pressing force transmitted through the pressing protrusion 214a may be entirely transmitted to the rotary unit body 224 through the interlocking surface 227. Accordingly, the pressing force of the pressing protrusion 214a may be entirely converted into a rotational force of the rotary unit body 224. When the pressing protrusion 214a rotates, since the interlocking surface 227 moves according to the movement of the pressing protrusion 214a, the rotary unit body 224 which receives a force through the interlocking surface 227 may rotate about the rotation center of the fixing block 222 by a distance as much as the rotation of the pressing protrusion 214a. The operation may mean that a force generated by the rotation of the knob 210 can be stably transmitted to the rod through the rotary unit 220.

The interlocking surface 227 may include a first region 227a, a second region 227b, and a third region.

The first region 227a may be a region in which the pressing protrusion 214a is disposed at the first position P1. The first region 227a may include a 1-1 region 227a-1 and a 1-2 region 227a-2.

As illustrated in FIG. 7, the 1-1 region 227a-1 may be a portion in contact with the pressing protrusion 214a disposed at the first position P1. The 1-2 region 227a-2 may be a portion not in contact with the pressing protrusion 214a disposed at the first position P1. Accordingly, the first region 227a may have a shape inclined downward from the 1-1 region 227a-1 toward the 1-2 region 227a-2 in a direction from the rotary unit body 224 toward the link 226.

The second region 227b may be a region at which the pressing protrusion 214a is disposed at the second position P2. The second region 227b may include a 2-1 region 227b-1 and a 2-2 region 227b-2.

As illustrated in FIG. 7, the 2-1 region 227b-1 may be a portion not in contact with the pressing protrusion 214a disposed at the second position P2. The 2-2 region 227b-2 may be a portion in contact with the pressing protrusion 214a disposed at the second position P2. Accordingly, the second region 227b may have a shape inclined downward from the 2-1 region 227b-1 toward 2-2 region 227b-2 in the direction from the rotary unit body 224 toward the link 226.

The third region may be disposed between the first region 227a and the second region 227b. The third region may be a central portion between the first region 227a and a position to which the pressing protrusion 214a moves toward the second region 227b. Accordingly, the pressing protrusion 214a may be in contact with an entire portion of the third region not only in contact with the 1-1 region 227a-1 at the first position P1 or the 2-2 region 227b-2 at the second position P2. However, the present invention is not limited thereto. The pressing protrusion 214a in contact with the third region may be in contact with only a right region in the third region at a portion close to the first region 227a or left region in the third region at a portion close to the second region 227b.

As illustrated in FIG. 7, The interlocking surface 227 may have a shape inclined upward in a direction from the first region 227a toward the second region 227b based on a direction from the pushing part 224b toward the rotating part 224a.

The interlocking surface 227 having the shape of the first region 227a and the shape of the second region 227b may have a shape inclined in a direction from the 1-1 region 227a-1 toward the 2-2 region 227b-2. That is, the interlocking surface 227 may have a triple inclined structure in which two regions have the inclined shapes and has the shape inclined upward from the first region 227a toward the second region 227b and the shapes inclined toward the intersecting individual regions at the same time.

Accordingly, when the pressing protrusion 214a disposed at the first position P1 to be in contact with the 1-1 region 227a-1 moves to be disposed at the second position P2, a torsional force may be generated on the interlocking surface 227 through the pressing protrusion 214a. In addition, when the pressing protrusion 214a rotates about the rotating shaft 218, a position of the link 226 may be changed by the torsional force in a direction from the rotating part 224*a* toward the pushing part 224*b*.

Accordingly, the rotary unit body 224 may be rotated about the rotation center of the fixing block 222 by the torsional force transmitted to the link 226.

In the glove box assembly 10 according to one embodiment of the present invention, the torsional force is generated due to a structure of the pressing protrusion 214*a* and the interlocking surface 227, and the glove box assembly 10 may have a structure in which the pressing protrusion 214*a* is continuously in contact with the interlocking surface 227 when the pressing protrusion 214*a* rotates. Accordingly, since a rotation distance of the rotary unit 220 may be finely adjusted according to a degree that the user manipulates the knob 210, the present invention can have an effect that the user can open or close the glove box 100 even with a small force.

The link 226 may include a plurality of grooves 228. The plurality of grooves 228 may be disposed in the interlocking surface 227 of the link 226. The plurality of grooves 228 may be disposed apart from each other in the interlocking surface 227 and may have a concave shape inward from the link 226. The plurality of grooves 228 are portions for reducing a contact area of the pressing protrusion 214*a*, and the generation of an excessive frictional force can be prevented by the plurality of grooves 228 when the pressing protrusion 214*a* presses the interlocking surface 227. Accordingly, damage to the pressing protrusion 214*a* or the interlocking surface 227 can be prevented due to the plurality of groove 228.

The first rod 230 may be disposed under the rotary unit 220 based on a direction from the knob 210 toward the rotary unit 220. The first rod 230 may be connected to the rotary unit 220 and the gear unit 250. The first rod 230 may receive a rotational force generated by the rotary unit 220 to move. The first rod 230 may be disposed in the longitudinal direction of the knob body 214.

The first rod 230 may include a protruding frame 232. The protruding frame 232 may have a shape protruding from a part of the first rod 230. The protruding frame 232 may be provided to have a height sufficient such that, when the pushing part 224*b* rotates with the rotating part 224*a*, the pushing part 224*b* is not separated from the protruding frame 232 and a state in which the pushing part 224*b* is in contact with the protruding frame 232 is not released. For example, a height of the protruding frame 232 may correspond to a height of the first rod 230.

The protruding frame 232 may be in contact with an end portion of the pushing part 224*b* of the rotary unit body 224. The protruding frame 232 may have a width corresponding to a thickness of the end portion of the pushing part 224*b* for stable contact with the end portion of the pushing part 224*b*.

As the pressing protrusion 214*a* moves from the first position P1 toward the second position P2, the first rod 230 may move with the protruding frame 232 pressed by the pushing part 224*b* of the rotary unit body 224. More specifically, in a state in which the pushing part 224*b* is in contact with the protruding frame 232, when the pressing protrusion 214*a* rotates, the pushing part 224*b* may rotate with the rotating part 224*a*. In this case, a rotational force may be generated by the rotating part 224*a* which rotates about the rotation center of the fixing block 222, and the rotational force may be transmitted to the protruding frame 232. The rotational force transmitted to the protruding frame 232 is converted into a pressing force pressing the protruding frame 232 in a direction from the first rod 230 toward the second rod 240, and the pushing part 224*b* pushes the protruding frame 232. When the protruding frame 232 is pushed, the first rod 230 in a state of being engaged with a gear of the gear unit 250 also moves. A stopper ST may be disposed on the first rod 230. The stopper ST may be a component which stops forward movement of the protruding frame 232 and can prevent excessive forward movement of the rotary unit 220 and the knob 210. Accordingly, lifetimes of the knob 210, the rotary unit 220, and the first rod 230 can increase due to the stopper ST.

The assembly for the glove box 100 according to one embodiment of the present invention may have a structure in which a force generated by the rotation of the knob 210 is stably transmitted to the first rod 230 through the rotary unit 220 and loss of the force generated by the knob 210 is minimized. Accordingly, since the first rod 230 moves in proportion to a degree of a force of the knob 210 applied by the user, even when the user manipulates the knob 210 with a small force, the first rod 230 can move, and thus user's ease of manipulation can be improved.

The second rod 240 may be disposed apart from the first rod 230 around the gear of the gear unit 250. The second rod 240 may be engaged with the gear of the gear unit 250. When the knob 210 rotates, and the first rod 230 is moved by the rotary unit 220, the second rod 240 may move in a direction opposite to a direction in which the first rod 230 is moved by the gear unit 250 to open the storage part 120 of the glove box 100.

As illustrated in FIG. 9, a second return spring S2 may be disposed on the second rod 240. When the user pulls and releases the knob body 214, the second return spring S2 may return the first rod 230 to a position before the first rod 230 moves.

The gear unit 250 may be disposed in a region in which an end portion of the first rod 230 and an end portion of the second rod 240 overlap. The gear unit 250 may include the gear engaged with the first rod 230 and the second rod 240, a body which rotatably supports the gear, and a guide member which is provided on the body and guides the movement of the first rod 230 and the second rod 240 in a straight direction.

According to one embodiment, since an opening and closing apparatus is disposed at a position at which a user's hand is easy to access, in addition to a person seated on a passenger's seat, a person seated on a driver's seat can easily open or close a glove box, and thus ease of use of a glove box assembly can be improved.

In addition, since a force applied to the user's hand is small, user's convenience can be improved.

The present disclosure has been made in an effort to solve problems in the related art, and the present disclosure is directed to a design of a glove box opening and closing apparatus having a shape and an operational structure in consideration of an increase in the number of components and an increase in cost.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A glove box opening and closing apparatus comprising:
   a knob rotatably coupled to a glove box and configured to be disposed at one of a first position and a second position;
   a rotator configured to rotate in conjunction with rotation of the knob; and
   at least one rod configured to move in conjunction with the rotation of the rotator,
   wherein the rotator includes a link in contact with the knob,
   an interlocking surface is formed on the link, and
   a contact area of the interlocking surface changes as the knob moves from the first position to the second position,
   wherein the knob includes:
     a first housing coupled to the glove box;
     a knob body in the first housing; and
     a rotating shaft which connects the first housing and the knob body and is a rotation center of the knob body wherein the knob body includes a pressing protrusion which protrudes from a part of the first housing in a direction from the first housing toward the rotator and of which an end portion is in contact with the interlocking surface.

2. The glove box opening and closing apparatus of claim 1, wherein the interlocking surface is disposed inside a rotation path of the knob.

3. The glove box opening and closing apparatus of claim 1, wherein:
   the knob includes a second housing connected to the rotating shaft and coupled to the rotator through a coupling member;
   the rotator includes a fixing block fixed to the second housing by the coupling member and a rotator body rotatably coupled to the fixing block; and
   the link is disposed at one side of the rotator body in a longitudinal direction of the rotating shaft.

4. The glove box opening and closing apparatus of claim 3, wherein:
   the pressing protrusion maintains a state of not pressing the interlocking surface when the link is disposed at the first position and maintains a state of pressing the interlocking surface when the link is disposed at the second position; and
   the pressing protrusion is rotatable between the first position and the second position.

5. The glove box opening and closing apparatus of claim 3, wherein the rotator body has a rotation distance corresponding to a rotation distance of the pressing protrusion which rotates from the first position toward the second position.

6. The glove box opening and closing apparatus of claim 3, wherein the rod includes a protruding frame in contact with the rotator body, and wherein the rotator body is configured to move with the protruding frame pressed by the rotator body in response to the pressing protrusion moving from the first position toward the second position.

7. The glove box opening and closing apparatus of claim 1, wherein the interlocking surface includes:
   a first region in which the pressing protrusion is disposed at the first position; and
   a second region in which the pressing protrusion is disposed at the second position.

8. The glove box opening and closing apparatus of claim 7, wherein the first region includes:
   a 1-1 region in contact with the pressing protrusion disposed at the first position; and
   a 1-2 region not in contact with the pressing protrusion disposed at the first position.

9. The glove box opening and closing apparatus of claim 8, wherein the second region includes:
   a 2-1 region not in contact with the pressing protrusion disposed at the second position; and
   a 2-2 region in contact with the pressing protrusion disposed at the second position.

10. The glove box opening and closing apparatus of claim 9, wherein the interlocking surface has a shape inclined in a direction from the 1-1 region toward the 2-2 region.

11. A glove box assembly comprising:
    a glove box coupled to a dashboard of a vehicle; and
    a glove box opening and closing apparatus which is attached to the glove box and configured to open or close an inner portion of the glove box,
    wherein the glove box opening and closing apparatus includes a knob rotatably coupled to a glove box and configured to be disposed at one of a first position and a second position, a rotator configured to rotate in conjunction with rotation of the knob, and at least one rod configured to move in conjunction with the rotation of the rotator,
    the rotator includes a link in contact with the knob,
    an interlocking surface is formed on the link, and
    a contact area of the interlocking surface changes as the knob moves from the first position to the second position,
    wherein the knob includes:
    a first housing coupled to the glove box;
    a knob body in the first housing; and
    a rotating shaft which connects the first housing and the knob body and is a rotation center of the knob body,
    wherein the knob body includes a pressing protrusion which protrudes from a part of the first housing in a direction from the first housing toward the rotator and of which an end portion is in contact with the interlocking surface.

12. The glove box assembly of claim 11, wherein the interlocking surface is disposed inside a rotation path of the knob.

13. The glove box assembly of claim 11, wherein:
the knob includes a second housing connected to the rotating shaft and coupled to the rotator through a coupling member;
the rotator includes a fixing block fixed to the second housing by the coupling member and a rotator body rotatably coupled to the fixing block; and
the link is disposed at one side of the rotator body in a longitudinal direction of the rotating shaft.

14. The glove box assembly of claim 13, wherein:
the pressing protrusion maintains a state of not pressing the interlocking surface when the link is disposed at the first position and maintains a state of pressing the interlocking surface when the link is disposed at the second position; and
the pressing protrusion is rotatable between the first position and the second position.

\* \* \* \* \*